I. C. BROWN AND T. HILLE.
DEVICE FOR CONTROLLING HEADLIGHTS.
APPLICATION FILED FEB. 24, 1921.
1,409,661. Patented Mar. 14, 1922.
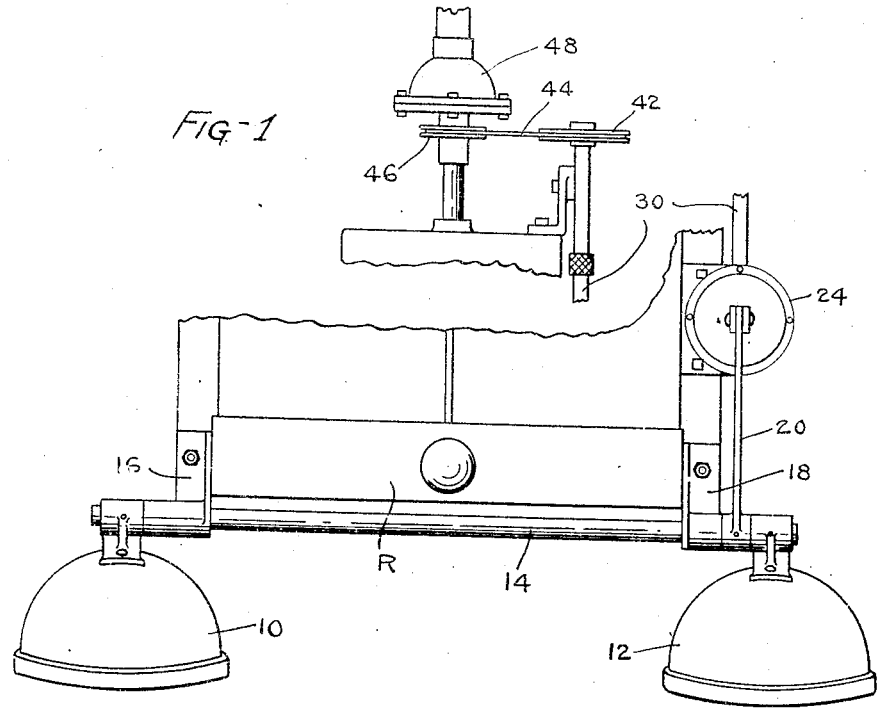
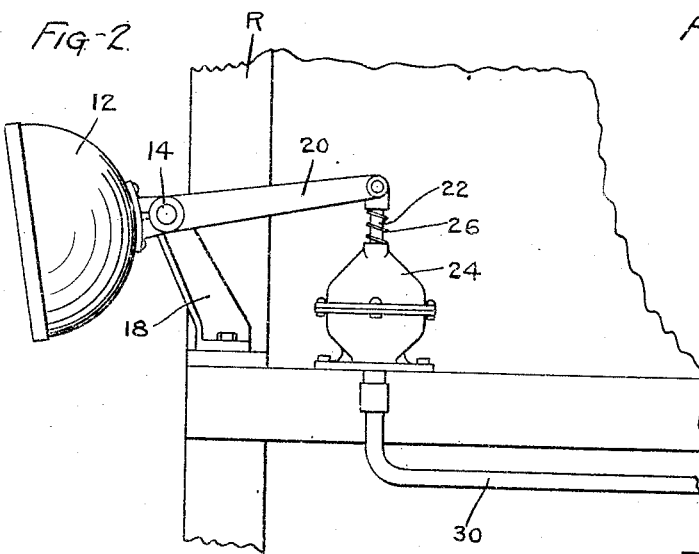
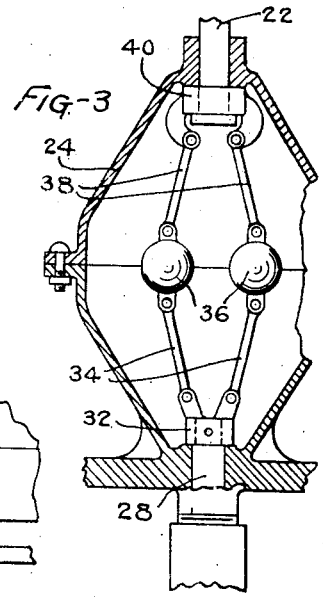
INVENTORS.
IRWIN C. BROWN.
THOMAS HILLE.
BY Whiteley and Ruckman
ATTORNEYS

UNITED STATES PATENT OFFICE.

IRWIN CHARLES BROWN, OF MINNEAPOLIS, AND THOMAS HILLE, OF FERGUS FALLS, MINNESOTA.

DEVICE FOR CONTROLLING HEADLIGHTS.

1,409,661.  Specification of Letters Patent.  Patented Mar. 14, 1922.

Application filed February 24, 1921. Serial No. 447,495.

*To all whom it may concern:*

Be it known that we, IRWIN C. BROWN and THOMAS HILLE, citizens of the United States, residing at Minneapolis, in the county of Hennepin, State of Minnesota, and at Fergus Falls, in the county of Otter Tail and State of Minnesota, respectively, have invented certain new and useful Improvements in Devices for Controlling Headlights, of which the following is a specification.

Our invention relates to devices for controlling headlights, and an object is to provide a device which will cause the rays of light to strike the ground a lesser or greater distance in front of the vehicle according to the speed at which it is being run. Another object is to provide a device which obviates the necessity or desirability of providing dimmers or special lenses for subduing the light emanating from automobile headlights. Another object is to provide a device of this character which will operate automatically and thus not require the attention of the driver. We accomplish the objects of our invention by providing a device which insures that the rays of light shall be thrown upon the road a short distance in front of the automobile when running slowly, and that they shall be thrown upon the road a greater distance in front of the automobile for faster speeds.

The full objects and advantages of our invention will appear in connection with the detailed description, and the novel features embodied in our inventive idea will be particularly pointed out in the claims.

In the accompanying drawings which illustrate the principle of our invention in one form,—

Fig. 1 is a plan view showing a portion of an automobile provided with our invention. Fig. 2 is a fragmentary view in side elevation. Fig. 3 is a sectional view of one form of governor which may be used.

Referring to the embodiment of our invention shown in the drawings, the numerals 10 and 12 designate a pair of headlights which are secured to the ends of a shaft 14 mounted in bearings at the upper ends of brackets 16 and 18 secured to the frame of the automobile so that the headlights are mounted for oscillating movement in vertical planes a short distance in front of the customary radiator R. Secured to the shaft 14 at any suitable place, for instance, adjacent one of the headlights, is an arm 20 to the rear end of which is pivoted a rod 22 slidably mounted in an opening in the upper end of a governor casing 24 secured to the front of the automobile. A spring 26 is interposed between the top of the casing and a shoulder on the rod. The lower end of the rod is connected through a suitable centrifugal governor with one end of a flexible rotatable shaft 28 which extends through an opening in the lower end of the casing 24 and is surrounded by a tube 30. As one means for connecting the shaft and the slidable rod, we show a collar 32 secured to the shaft 28, links 34 pivotally attached to this collar, and two weights 36 and links 38 pivotally attached to the weights and to a collar 40 swivelled upon the lower end of the rod 22 whereby centrifugal action of the weights will pull the rod downwardly in opposition to the tension exerted by the spring 26 which under normal conditions holds the rod upwardly. The other end of the shaft 28 is adapted to be driven in suitable manner from some member of the automobile which rotates at a speed proportionate to the speed at which the vehicle is traveling. In the embodiment shown, the shaft is provided with a driven wheel 42 around which runs an endless flexible element 44 also running around a driving wheel 46 secured for operation in connection with the transmission 48, but it is obvious that the shaft 28 may be connected for operation with any suitable operating part of the automobile.

The operation and advantages of our invention will be obvious from the foregoing description. The glare of headlights which is universally recognized as very dangerous to oncoming vehicles is positively prevented when the automobile is slowed as is customary when meeting other vehicles. At the same time, the light is thrown upon the road a sufficient distance in front of the automobile to make driving safe, and the full force of the light is obtained ahead of the vehicle without cutting off any of it by the use of dimmers or in other manner. As the speed of the automobile is increased, the distance in front of the automobile at which the rays strike the road is correspondingly increased, a condition which is extremely desirable in order to increase the safety at which automobiles may be driven at high speed at night.

We claim:

1. A device for controlling headlights comprising means for supporting a headlight on a vehicle for oscillation in a vertical plane, a governor mounted on the vehicle, connections between the headlight and said governor, and means for operating said governor to an extent uniformly proportionate to the speed of the vehicle for automatically rocking the headlight upwardly as the speed of the vehicle increases.

2. A device for controlling headlights comprising a horizontal shaft oscillatingly mounted on the vehicle, a headlight secured to said shaft, means for normally holding the headlight downwardly, a centrifugal governor mounted on the vehicle, connections between said shaft and said governor, and means for rotating said governor at a speed uniformly proportionate to that of the vehicle for automatically rocking the headlight upwardly as the speed of the vehicle increases.

In testimony whereof we hereunto affix our signatures.

IRWIN CHARLES BROWN.
THOMAS HILLE.